US006219527B1

(12) United States Patent
Ogawa

(10) Patent No.: US 6,219,527 B1
(45) Date of Patent: Apr. 17, 2001

(54) RADIO APPARATUS IN WHICH SLACKENING IS PREVENTED AS REGARDS A CABLE CONNECTED TO AN ANTENNA

(75) Inventor: Takashi Ogawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/188,054

(22) Filed: Nov. 6, 1998

(30) Foreign Application Priority Data

Nov. 7, 1997 (JP) .................................................. 9-322210

(51) Int. Cl.[7] ..................................................... H04B 7/185
(52) U.S. Cl. ........................................... 455/13.1; 455/562
(58) Field of Search .............................. 455/13.1, 25, 82, 455/562, 97, 129, 291, 282, 550, 575, 90, 347, 348; 343/713, 730, 803, 853, 765, 903, 702; 333/126, 132; 226/118.4; 254/272, 277, 392; 242/388.9, 388.91

(56) References Cited

U.S. PATENT DOCUMENTS

| | | | | |
|---|---|---|---|---|
| 4,393,383 | * | 7/1983 | Yamashita | 343/903 |
| 4,717,923 | * | 1/1988 | Kimura | 343/903 |
| 4,912,820 | * | 4/1990 | Bregier | 26/71 |
| 5,243,355 | * | 9/1993 | Emmert et al. | 343/702 |
| 5,511,120 | * | 4/1996 | Hirata et al. | 379/433 |
| 5,777,586 | * | 7/1998 | Luxon et al. | 343/702 |
| 5,850,612 | * | 12/1998 | Kulberg et al. | 455/550 |
| 5,852,422 | * | 12/1998 | Imanishi | 343/702 |
| 5,950,116 | * | 9/1999 | Baro | 455/90 |
| 6,052,567 | * | 4/2000 | Ito et al. | 455/90 |

FOREIGN PATENT DOCUMENTS 6-303295 10/1994 (JP) .

* cited by examiner

*Primary Examiner*—Reinhard Eisenzopf
*Assistant Examiner*—N Mehrpour
(74) *Attorney, Agent, or Firm*—Ostrolenk, Faber, Gerb & Soffen, LLP

(57) ABSTRACT

In a radio apparatus having a rod-like antenna (6), a cable (12) has one end electrically and mechanically connected to the antenna and is urged by a urging arrangement (22,24) so that it is prevented from slackening. The other end of the cable is fixed to an electrical part such as a circuit board (14) contained in a casing (4) of the radio apparatus. The antenna is stored in a storage portion (8) of the casing so as to be movable in a direction parallel to an extension axis of the antenna. It is preferable that the urging arrangement is constituted by a combination of a tension pulley (22) and a spring member (24) which is interposed between the tension pulley and the casing for urging the tension pulley to make said cable have tension.

18 Claims, 7 Drawing Sheets

RADIO APPARATUS IN WHICH SLACKENING IS PREVENTED AS REGARDS A CABLE CONNECTED TO AN ANTENNA

BACKGROUND OF THE INVENTION

This invention relates to a radio apparatus such as a satellite personal handy-phone, in which an antenna stored in a case thereof is to be pulled out of the case for communication.

A conventional radio transmitter adopts a structure in which an antenna is stored in a storage portion provided in a main body case so as to enhance portability. The antenna is pulled out of the storage portion in the main body case only when communication is carried out. The antenna is stored in the storage portion in the main body case when communication is not carried out.

A radio apparatus having such a structure for storing the antenna is disclosed in Japanese Unexamined Patent Publication No. 6-303295.

In the conventional radio transmitter, the length of the cable connected to the antenna in the main body case is set to be larger than necessary so as to allow pulling-out/storing of the antenna. As a result, there occurs such a problem that the cable is moved around with the motion of the antenna.

Additionally, the cable is deformed into various shapes when the antenna is pulled out of or stored in the case. Therefore, there is a problem in which the cable in the main body case may hit or catch on other parts and damage the parts provided in the main body case or the cable itself

SUMMARY OF THE INVENTION

It is therefore an object of the present invention to provide a radio apparatus capable of restricting various deformations and motions of a cable connected to an antenna when the antenna is pulled out or stored.

It is another object of the present invention to provide a radio apparatus of the type described, in which any part or cable in the main unit case is never damaged.

It is still another object of the present invention to provide a radio apparatus of the type described, in which slackening is prevented as regards the cable.

Other objects of the present invention will be clear as the description proceeds.

According to the present invention, there is provided a radio apparatus comprising a rod-like antenna with an extension axis and a casing which has a storage portion for storing the antenna so as to be movable in a particular direction parallel to the extension axis. The radio apparatus further comprises a cable, one end of which is electrically and mechanically connected to the antenna and the other end of which is fixed to an electrical part contained in the casing, and urging means engaged with the cable for urging the cable to prevent the cable from slackening.

DESCRIPTION OF THE PREFERRED EMBODIMENTS

Figure 1:
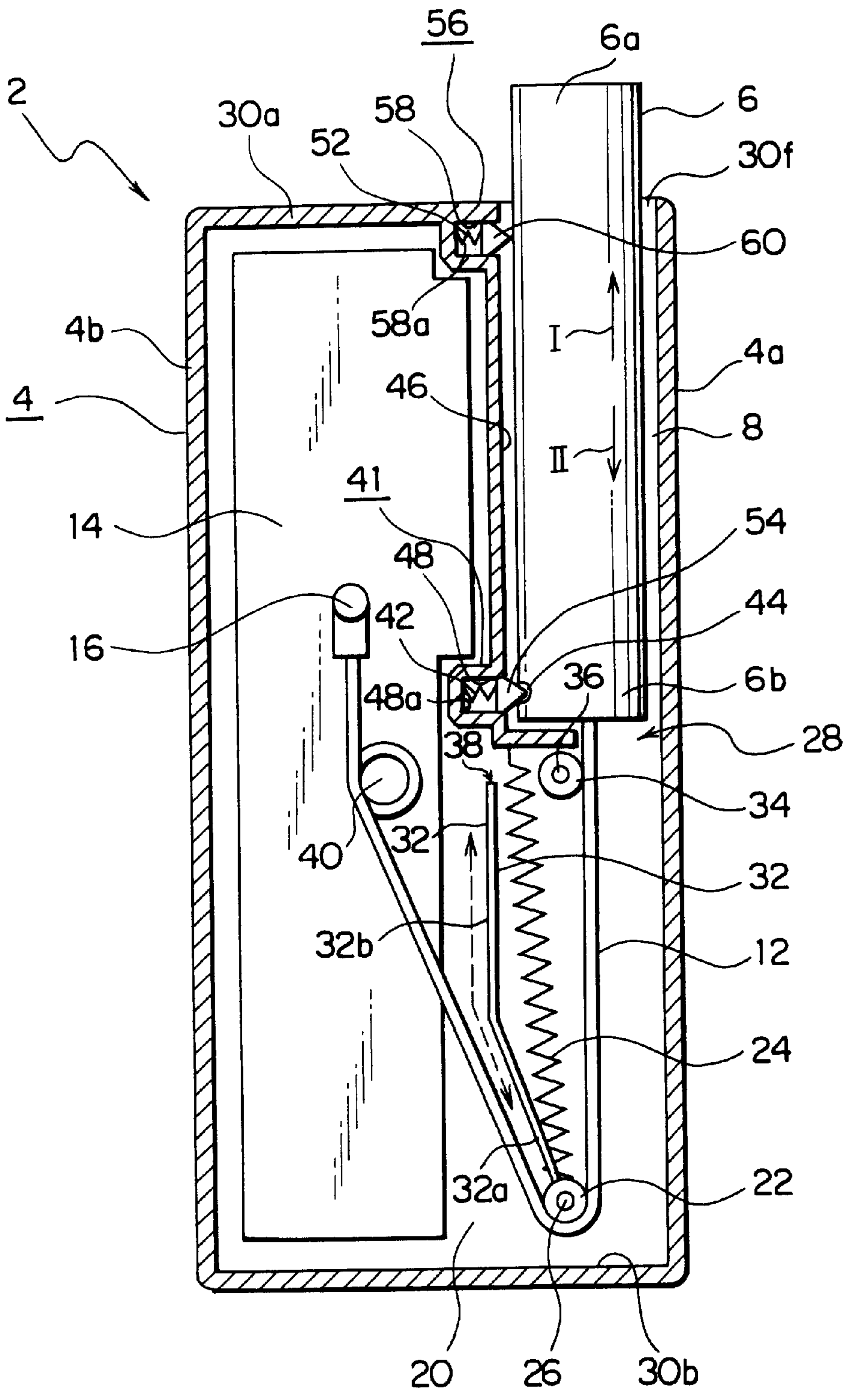
FIG. 1 is a front sectional view showing the first embodiment or a radio apparatus of the present invention.

With reference to the drawing, description will be made as regards radio apparatus according to embodiments of the present invention. Each radio apparatus will be described by referring to a satellite personal handy-phone utilizing satellite communication as a specific example of the radio apparatus.

Figure 2:
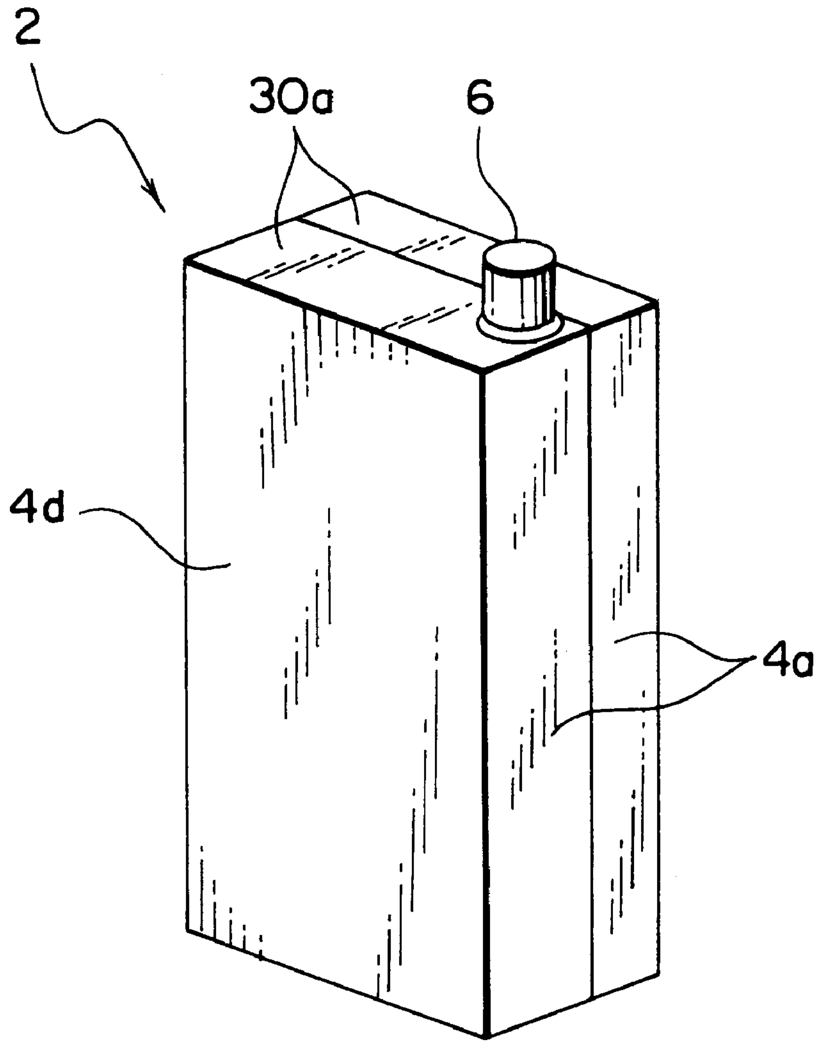
FIG. 2 is an external view of the ratio apparatus shown in FIG. 1.
Figure 3:
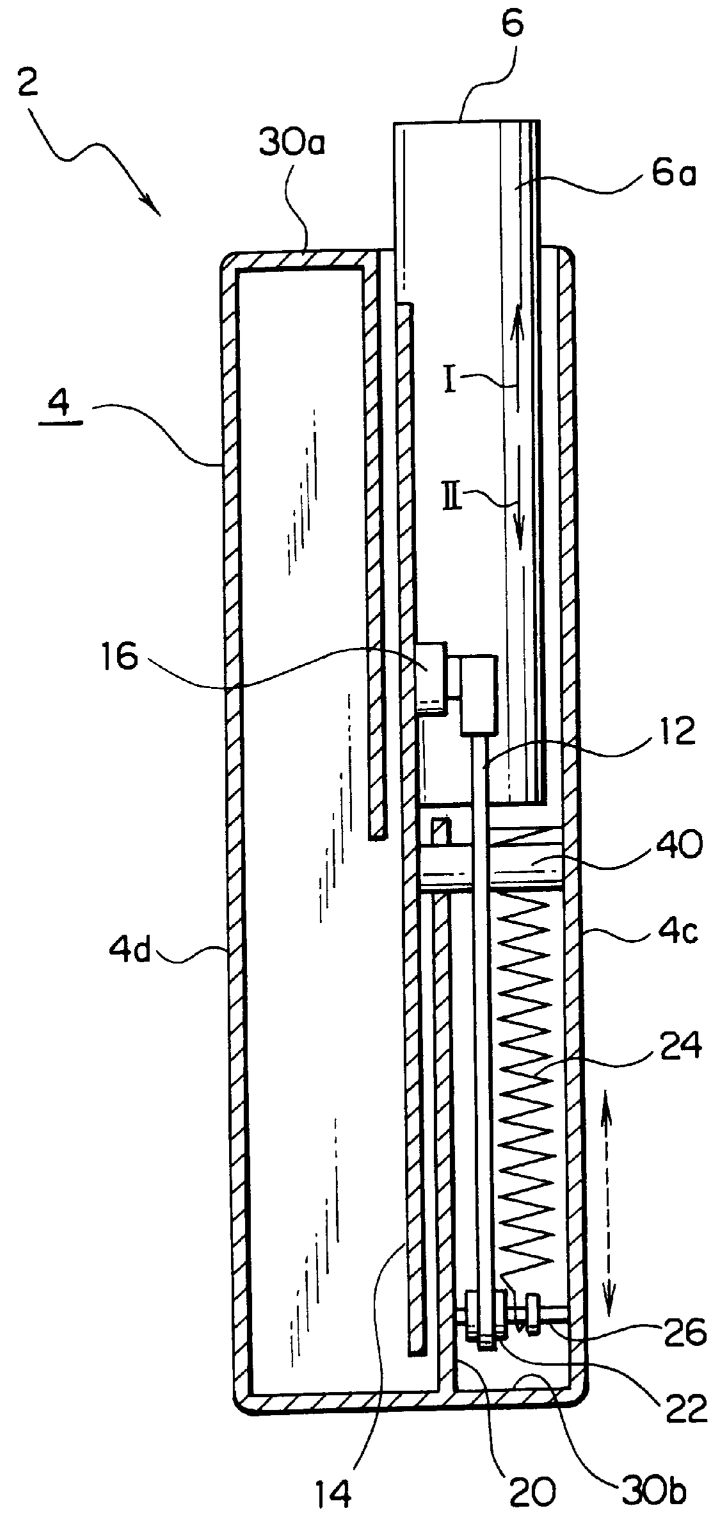
FIG. 3 is a side sectional view of the radio apparatus shown in FIG. 1.

Referring to FIGS. 1–3, a radio apparatus 2 according to a first embodiment of the present invention comprises a casing or a box-shaped main unit case 4 and a rod-like antenna 6 which can be stored in or pulled out of the main unit case 4.

The main unit case 4 comprises a first side wall portion 4*a*, a second side wall portion 4*b* opposing the first side wall portion 4*a* in parallel therewith, a third side wall portion 4*c* joining ends of the first and second side wall portions 4*a* and 4*b*, and a fourth side wall portion 4*d* joining the other ends of the first and second side wall portions 4*a* and 4*b*.

The main unit case 4 is formed to have a box-like appearance by further comprising a top plate portion 30*a* for closing top ends of the first-fourth side wall portions 4*a*–4*d* and a bottom plate portion 30*b* for closing bottom ends of the first-fourth side wall portions 4*a*–4*d*.

A storage portion 8 having a space large enough for storing the antenna 6 is formed in the main unit case 4. The antenna 6 is supported in the storage portion 8 such that it is capable of being axially moved in upward and downward moving directions I and II. Even in a condition in which the antenna 6 is stored in the storage portion 8, an upper end portion 6*a* of the antenna 6 is projected slightly from the top plate portion 30*a* of the main unit case 4. In this condition, a base portion 6*b* at a lower portion or the antenna 6 is located in a bottom portion of the storage portion 8.

One end of a coaxial cable (hereinafter referred to as cable) 12 is electrically and mechanically connected to the base portion 6*b* or the antenna 6. A connection portion 16 is provided at the other end of the cable 12. The connection portion 16 is electrically and mechanically connected to a circuit board 14 like a printed circuit board, stored in the main unit case 4. The cable 12 has an enough length for allowing the pulling-out and storing operations of the antenna 6.

As evident from FIG. 3, the surface of the circuit board 14 on which a circuit is formed is located so that it is opposite to the third side wall portion 4*c* of the main unit case 4 in parallel therewith at predetermined distance. Further, a partition wall portion 20 which will be later described in detail is provided between the third side wall portion 4*c* and the circuit board 14 in parallel with the third side wall portion 4*c* at a predetermined distance.

A tension pulley or a first pulley 22 as a tension pulley is provided in the main unit case 4. The first pulley 22 is supported by a supporting shaft 26 between the partition wall portion 20 and third side wall portion 4*c* so that it is capable of moving in the aforementioned moving directions I, II of the antenna 6. A coil spring 24 is located between a base portion 28 (or the side wall portion 20) of the storage portion 8 and the first pulley 22. The first pulley 22 is urged by the coil spring 24 at the supporting shaft 26 in the moving direction II of the antenna 6 being stored. A combination of the first pulley 22 and the coil spring 24 in referred to as an urging arrangement.

The coaxial cable 12 extending from the base portion 6*b* of the antenna 6 toward the first pulley 22 in the moving direction II of the antenna 6 being stored as shown in FIG. 1 and is turned back by the first pulley 22. That is, the cable 12 is urged by the first pulley 22 to prevent slackening thereof.

Grooves 32 are formed vertically on the third side wall portion 4*c* and partition wall portion 20 such that they are opposite to each other. In FIG. 1, only the groove 32 on the partition wall portion 20 is shown. Both ends of the supporting shaft 26 of the first pulley 22 are slidably fitted within the grooves 32. The groove 32 includes a first groove portion 32*a* extending upward from the vicinity of the bottom plate portion 30*b* so that it is slightly inclined relative to the moving directions I, II of the antenna 6 and a second groove portion 32*b* extending upward from an upper end of the first groove portion 32*a* up to the position near the storage portion 8. The second groove portion 32*b* is in parallel with the moving directions I, II of the antenna 6. Arrows shown by broken lines in FIG. 1 indicate directions in which the first pulley 22 moves within the groove 32.

A guide pulley or a second pulley 34 for restricting the direction of the extending cable 12 is provided in the vicinity of the base portion 28 as the bottom portion of the storage portion 8. A supporting shaft 36 for the second pulley 34 is provided so that it is mounted on and fixed to the partition wall portion 20.

The connection portion 16 is fixed on the circuit board 14 substantially in the middle of the circuit board 14. A cylindrical guide protrusion 40 having a circular transverse section is provided in the vicinity of the connection portion 16 on the circuit board 14 for restricting the direction of the extending cable 12. The guide protrusion 40 and second pulley 34 are located at substantially the same height above the bottom plate portion 30*b*. As clearly shown in FIG. 1, a top end portion 38 of the second-groove 32*b* is located between the guide protrusion 40 and second pulley 34.

The storage portion 8 for storing the antenna 6 has the first side wall portion 4*a* and a plate-like fifth side wall portion 46 which is opposite to the upper part of the first side wall portion 4*a* at a predetermined distance. The fifth side wall portion 46 extends in the moving directions I, II of the stored antenna 6.

The antenna 6 has an antenna engaging portion 44 as a dent on a side of the base portion 6*b*. The storage portion 8 has a first locking mechanism 41 for locking the antenna 6 in a condition that it is stored in the main unit case 4.

The first locking mechanism 41 includes a first holding chamber 48 formed in a dent shape at a position on the fifth side wall portion 46 facing the base portion 6*b* of the stored antenna 6, a first compression spring 42 one end of which is in contact with an innermost portion 48*a* of the first holding chamber 48, and a first pressing piece 54 in contact with the other end of the first compression spring 42. The first compression spring 42 is located between the innermost portion 48*a* of the first holding chamber 48 and the first pressing piece 54. The first pressing piece 54 is hold so that it is capable of coming in and out of the first holding chamber 48 via the first compression spring 42.

The storage portion 8 has a second locking mechanism 56 for locking the antenna 6 in a condition that the antenna 6 is pulled out of the main unit case 4. The second locking mechanism 56 is provided on a portion of the top plate portion 30*a* which faces an antenna hole portion 30*f* formed in the top plate portion 30*a*.

The second locking mechanism 56 includes a second holding chamber 58 formed in a dent shape on an upper portion of the fifth side wall portion 46 facing the antenna 6, a second compression spring 52 one end of which is in contact with an innermost portion 58*a* of the second holding chamber 58 and a second pressing piece 60 in contact with the other end of the second compression spring 52. The second compression spring 52 is located between the innermost portion 58*a* of the second holding chamber 58 and second pressing piece 60. The second pressing piece 60 is held so that it is capable of coming in or out of the second holding chamber 58 via the second compression spring 52.

Next, an operation of the radio apparatus 2 having such a structure will be described. In a condition in which the antenna 6 is stored in the storage portion 8 as shown in FIG. 1, most of the cable 12 extends into the interior of the main body case 2 from the storage portion 8. At this time, the first pulley 22 urged by the coil spring 24 has been moved to the bottom end portion of the first groove 32*a*. Therefore, at this time, the first pulley 22 has boon moved to a position the farthest from the storage portion 8. Thus, the first pulley 22 urges the cable 12 so as to prevent it from slackening. At this time, on the circuit board 14, the direction of extending the cable 12 between the first pulley 22 and connection portion 16 is restricted by the guide protrusion 40. In addition, the cable 12 between the guide protrusion 40 and connection portion 16 is appropriately guided so as to be in parallel with the moving directions I, II of the antenna 6.

Figure 4:
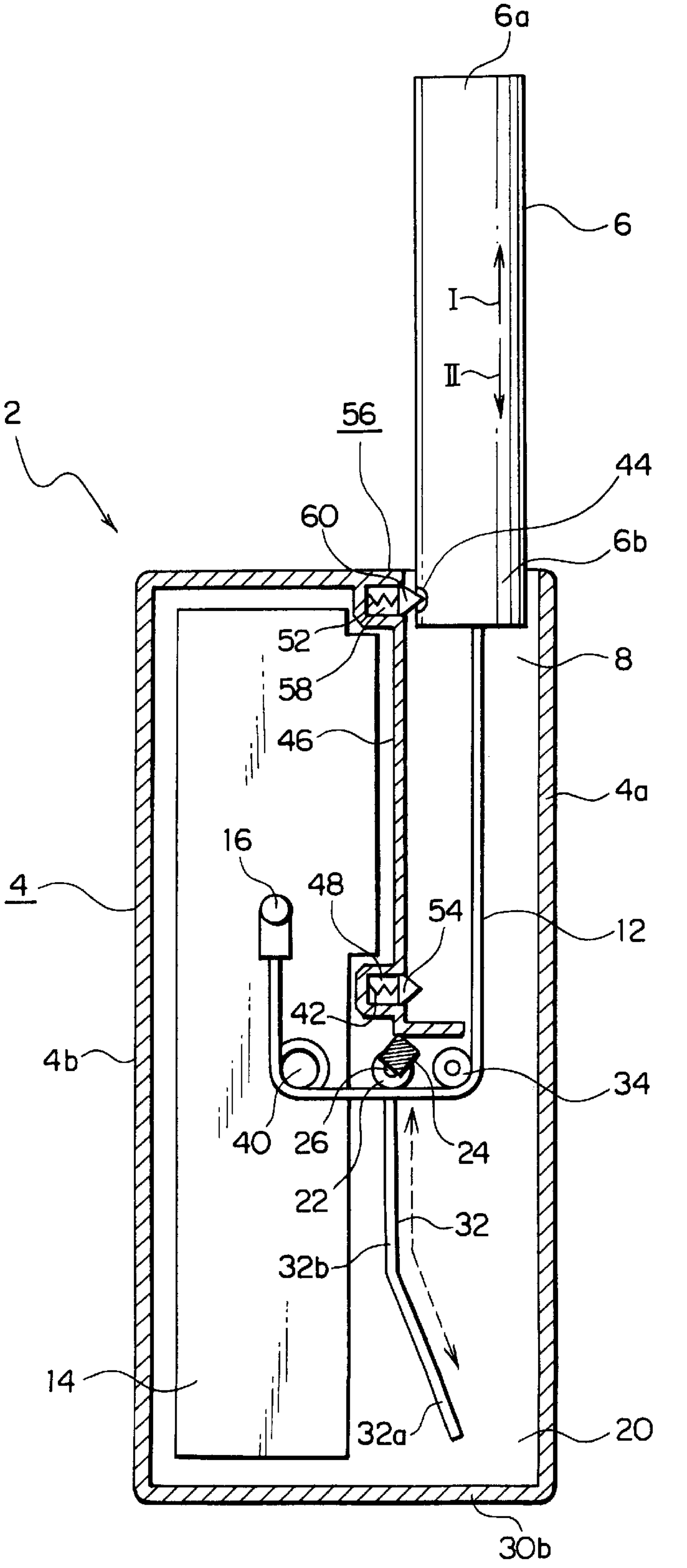
FIG. 4 is a front sectional view showing a state in which an antenna is pulled out of a main unit case of the radio Apparatus shown in FIG. 1.

On the other hand, when the antenna 6 is pulled out of the storage portion 8, the antenna 6 is pulled out against an urging force applied to the first pulley 22 by the coil spring 24 As a result, as shown in FIG. 4, the first pulley 22 is moved along the groom 32 to the nearest position to the bass portion 28 of the storage portion 8. At this time, the final position or the moved supporting shaft 26 of the first pulley 22 is the top end portion 38 of the second groove portion 32*b*. In a condition shown in FIG. 4, the first pulley 22 urges the coaxial cable 12 so as to prevent the cable 12 from slackening. At this time, the portion of the cable 12 extending from the base portion 6*b* of the antenna 6 to the second pulley 34 is appropriately guided by the second pulley 34 so that its direction is restricted to be in parallel with the moving directions I, II of the antenna 6.

In a condition in which the antenna 6 is stored in the storage portion 8 as shown in FIG. 1, the first pressing piece 54 constituting the first locking mechanism 41 is projected into the storage portion 8 by the first compression spring 42 so that it is fitted to the antenna engaging portion 44 formed on the circumference of the antenna 6. Then, the antenna 6 is locked by the first locking mechanism 41 in this stored state.

On the other hand, in a condition in which the antenna 6 is pulled out of the storage portion 8, the second pressing piece 60 is projected into the storage portion 8 by the compression spring 52 so that it is fitted to the antenna engaging portion 44. Then, the antenna 6 is locked by the second locking mechanism 56 with the antenna 6 being pulled out against an urging force of the coil spring 24.

As described above, in the radio apparatus 2 of the present embodiment, the cable 12 is always urged by the first pulley 22 to prevent the coaxial cable 12 from slackening.

Thus, when the antenna 6 is pulled out of or stored in the main unit case 4, the cable 12 moves always along a specified path in a predetermined region. Therefore, there never occurs such a problem that the cable 12 hits or catches any of the other parts in the main unit case 4 to damage the parts or the cable 12 itself.

Figure 5:
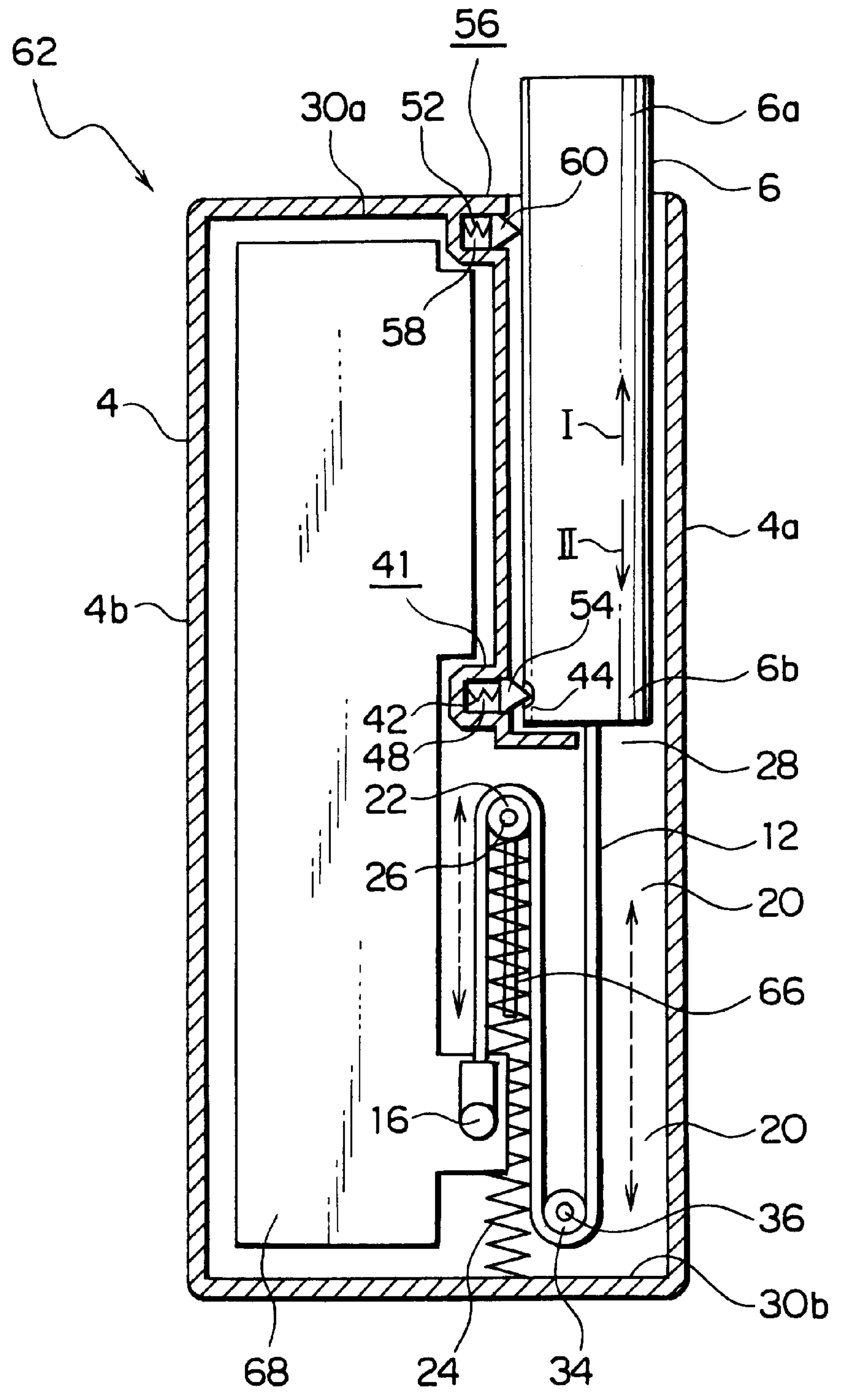
FIG. 5 is a front sectional view showing the second embodiment of the radio apparatus of the present invention.

Referring to FIG. 5, the description will be made as regards a radio apparatus according to a second embodiment of the present invention. The same reference numerals are given to the same components as those in the first embodiment, the description thereof being omitted.

The main unit case 4 of a radio apparatus 62 of the second embodiment comprises the first pulley 22 which is the same tension pulley as that in the first embodiment and the second pulley 34 for restricting the direction of the extending cable 12. The first pulley 22 is located in the vicinity of a portion below the base portion 28 of the storage portion 8. The supporting shaft 26 of the first pulley 22 is movably fitted within a groove 66 vertically formed in a straight line in each of the partition wall portion 20 and the third side wall portion 4*c*.

The second pulley 34 is located below the storage portion 8 and near the bottom plate portion 30*b*. The supporting shaft 36 of the second pulley 34 is provided so that it is mounted on and fixed to the partition wall portion 20.

The cable 12 is extended from the base portion 6*b* of the antenna 6 in the moving direction II for storing the antenna 6 and turned back in a substantially U shape at the second pulley 34. The cable 12 turned back at the second pulley 34 is further turned back at the first pulley 22 in a substantially U shape. The first pulley 22 is movably supported by the supporting shaft 26 in the moving directions I, II of the antenna 6. Further, the supporting shaft 26 of the first pulley 22 is urged by the coil spring 24 in the moving direction I of the antenna 6 being pulled out. An end of the coil spring 24 is supported by the supporting shaft 26 of the first pulley 22 and the other end is supported by the bottom plate portion 30*b* or partition wall portion 20.

Like the first embodiment, the grooves 66 formed on the partition wall portion 20 and third side wall portion 4*c* opposite to this partition wall portion 20 extend in parallel with the moving directions I, II of the antenna 6. Both end portions of the supporting shaft 26 are slidably fitted within the grooves 66. Thus, the first pulley 22 is capable of traveling along the groove 66.

The other end portion of the cable 12, namely, an opposite end to the antenna 6 is electrically and mechanically connected and fixed to the connection portion 16 on a circuit board 68 located at the same position as that in the first embodiment. The connection portion 16 in the second embodiment is located at a position near the bottom plate portion 30*b* of the circuit board 68 and further near the groove 66.

In the second embodiment also, the cable 12 is always urged by the first pulley 22 to prevent the cable 12 from slackening.

Thus, when the antenna 6 is pulled out of or stored in the main body case 4, the cable 12 moves always in a specified path in a predetermined region. Therefore, there never occurs a problem that the cable 12 hits or catches any of the parts in the main unit case 4 to damage the parts of the cable 12 itself. In this second embodiment, it is not necessary to provide the circuit substrate 14 with a protrusion like the guide protrusion 40 adopted in the first embodiment. In addition, the shape of the groove 66 is formed to be linear and well simplified. Arrows shown by broken lines in FIG. 5 indicate the moving direction of the cable 12 and the moving direction of the first pulley 22.

Figure 6:
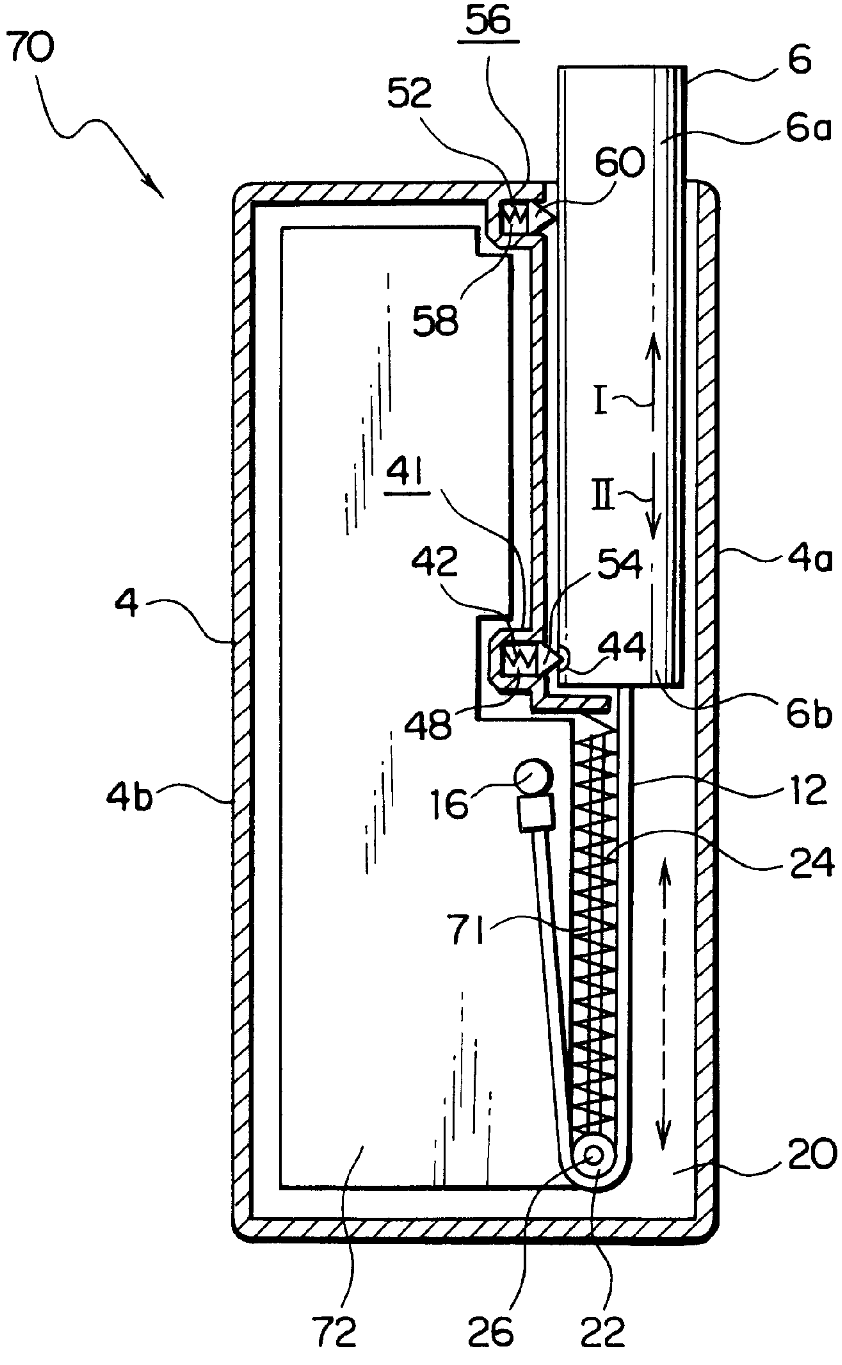
FIG. 6 is a front sectional view showing the third embodiment of the radio apparatus of the present invention.

Referring to FIG. 6, the description will be made as regards a radio apparatus according to a third embodiment of the present invention. The same reference numerals are given to the same components as those in FIG. 1, the description thereof being omitted.

In the main unit case 4 of the radio apparatus 70 of the third embodiment, the first pulley 22 which is the same as the first pulley 22 of a tension pulley described in the first embodiment is movably supported by the partition wall portion 20. The first pulley 22 is supported by the supporting shaft 26 between the partition wall portion 20 and third side wall portion 4*c* so that it is capable of being moved with a movement of the antenna 6 in the moving directions I, II. Further, the first pulley 22 is urged by the coil spring 24 via the supporting shaft 26 in the moving direction II of the antenna 6 being stored.

The cable 12 is extended from the base portion 6*b* of the antenna 6 in the moving direction II of the antenna 6 being stored, and then turned back by the first pulley 22. That is, the cable 12 is urged by the first pulley 22 so that it is prevented from slackening.

On each of the third side wall portion 4*c* and partition wall portion 20 a groove 71 is formed which is in parallel with the other. The grooves 71 extend from near the bottom of the storage portion 8 to a position near the bottom plate portion 30*b*.

In FIG. 6, there is shown only the groove 71 formed in the partition wall portion 20. Both end portions of the supporting shaft 26 of the first pulley 22 are slidably fitted within the grooves 71.

The coaxial cable 12 is extended from the base portion 6*b* of the antenna 6 in the moving direction II or the antenna 6 being stored and then turned back by the first pulley 22. An opposite end of the coaxial cable 12 is connected to the connection portion 16 provided near the storage portion 8 on the circuit substrate 72.

The first pulley 22 is supported by the linear groove 71 so that it is capable of moving in the direction of extending the antenna 6. Then, the first pulley 22 is urged in the moving direction II of the antenna 6 by the coil spring 24. Therefore, in the third embodiment as well, the coaxial cable 12 is always urged by the first pulley 22 so that it is prevented from slackening, hence the same effect as in the aforementioned first and second embodiments can be assured. Since, in the third embodiment, since only the first pulley 22 is used as a pulley, the structure is made simple so that the apparatus can be brought to realization with low cost. Meanwhile, arrows of broken lines shown in FIG. 7 indicate a moving direction of the cable 12 and a moving direction of the first pulley 22.

Figure 7:
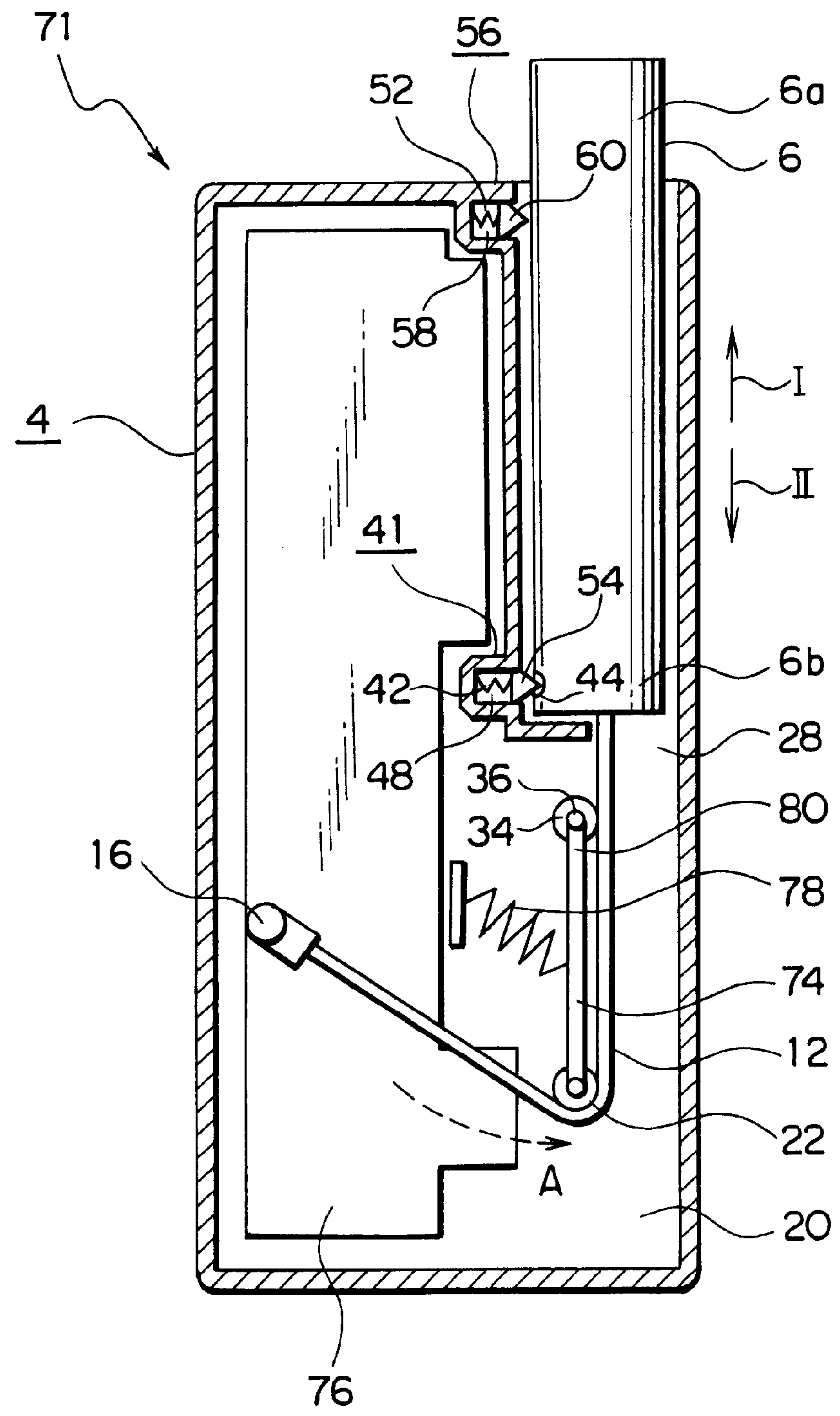
FIG. 7 is a front sectional view showing a fourth embodiment of the radio apparatus of the present invention.

The fourth embodiment of the present invention will next be described. FIG. 7 is a front sectional view showing the fourth embodiment. In the same figure, the same reference numerals are given to the same components as those in FIG. 1 and other Figures and a description thereof is omitted.

In the radio apparatus 70 of the fourth embodiment, there are provided the first pulley 22 which is the same tension pulley as the first pulley 22 mentioned in the first embodiment and the second pulley 34 disposed near the base portion 28 of the storage portion 8 for restricting the direction of extending the cable 12. The supporting shaft 36 of the second pulley 34 is provided so that it is mounted on and fixed on the partition wall portion 20.

The first pulley 22 is fixed to a lower end portion of a swingably supported arm 74. The arm 74 is urged by a coil spring 78 in such a direction that the first pulley 22 moves away from the base portion 28 of the storage portion 8 and the connection portion 16 of the cable 12 on the circuit substrate 76 (direction indicated by an arrow A of broken line). One end of the coil spring 78 is supported by the partition wall portion 20 and the other end thereof is supported by the supporting shaft 36 of the second pulley 34 joined to the arm 74. The arm 74 is swingably attached to supporting shaft 36 of the second pulley 34 provided near the base portion 28 of the storage portion 8, at an upper end portion 80 thereof.

Therefore, in the fourth embodiment as well, the cable 12 is always urged by the first pulley 22 so that it is prevented from slackening. Thus, the same effect as in the first to third embodiments can be assured. Additionally, in this embodiment, it is not necessary to form any groove for movably supporting the first pulley 22.

What is claimed:

1. A radio apparatus comprising a rod-like antenna with an extension axis and a casing which has a storage portion for storing said antenna so as to be movable in a direction parallel to said extension axis, said radio apparatus further comprising:

a cable, one end of which is electrically and mechanically connected to said antenna and the other end of which is fixed to an electrical part contained in said casing; and an urging arrangement engaged with said cable which urges said cable to prevent said cable from slackening said urging arrangement comprising:

a tension pulley movable in said casing between a first and a second position, said cable being extended from said antenna and turned at said tension pulley; and a spring member interposed between said tension pulley and said casing for urging said tension pulley towards said first position to make said cable have tension;

wherein said casing comprises two wall portions extending in said direction and being opposite to each other with a predetermined distance left therebetween, said wall portions having grooves extending parallel to each other, said tension pulley having a supporting shaft which is slidably fitted within said grooves.

2. A radio apparatus as claimed in claim 1, wherein said antenna is capable of being pulled out of said storage portion.

3. A radio apparatus as claimed in claim 1, wherein said antenna has a base portion positioned near a bottom of said storage portion when stored in said casing, said one end of the cable being connected to said base portion.

4. A radio apparatus as claimed in claim 1, wherein each of said grooves has a first groove portion apart from said storage portion and a second groove portion near said storage portion, said first groove portion being inclined relative to said direction, said second groove portion extending from said first groove portion in parallel to said direction.

5. A radio apparatus as claimed in claim 1, further comprising a guide pulley engaged with said cable to guide said cable between said tension pulley and said antenna.

6. A radio apparatus as claimed in claim 5, wherein said guide pulley is located near said storage portion.

7. A radio apparatus as claimed in claim 6, further comprising a guide protrusion fixed to said casing to guide said cable in the vicinity of said electrical part, said second position of the tension pulley being defined between said guide pulley and said guide protrusion.

8. A radio apparatus as claimed in claim 5, wherein said tension pulley is located near said storage portion, said guide pulley being located apart from said storage portion.

9. A radio apparatus as claimed in claim 8, wherein, when said antenna is stored in said storage portion, said cable is extended from said antenna in said direction, turned back at said guide pulley, and further turned back at said tension pulley.

10. A radio apparatus as claimed in claim 8, wherein said casing comprises two wall portions extending in said direction and being opposite to each other with a predetermined distance left therebetween, said wall portions having grooves extending parallel to each other, said tension pulley having a supporting shaft which is slidably fitted within said grooves.

11. A radio apparatus as claimed in claim 1, an arm swingably supported to said casing, said tension pulley being attached to said arm to be moved between said first and said second positions with a swing of said arm.

12. A radio apparatus as claimed in claim 11, further comprising a guide pulley disposed near said storage portion and having a supporting shaft, said arm being swingably supported by said supporting shaft.

13. A radio apparatus as claimed in claim 1, further comprising a locking mechanism for locking said antenna in a selected one of a first state where said antenna is stored in said storage portion and a second state where said antenna is pulled out of said storage portion.

14. A radio apparatus as claimed in claim 13, an engaging portion provided on a side of said antenna;

a first holding chamber formed to a wall portion defining said storage portion;

a first pressing piece held in said first holding chamber; and a first compression spring interposed between said wall portion and said first pressing piece for urging said first pressing piece onto said side of the antenna to engage said first pressing piece with said antenna engaging portion when said antenna is stored in said storage portion.

15. A radio apparatus as claimed in claim 14, wherein said engaging portion has a recessed portion recessed from said side of the antenna.

16. A radio apparatus as claimed in claim 14, wherein said locking mechanism further comprises:

a second holding chamber formed to said wall portion and apart from said first holding chamber in said direction;

a second pressing piece held in said first holding chamber; and a second compression spring interposed between said wall portion and said second pressing piece or urging said second pressing piece onto said side of the antenna to engage said second pressing piece with said antenna engaging portion when said antenna is pulled out of said storage portion.

17. A radio apparatus as claimed in claim 16, wherein said electrical part comprises a circuit board fixed to said casing, said other end of the cable being electrically and mechanically connected to said circuit board.

18. A radio apparatus as claimed in claim 1, wherein said cable is a coaxial cable.

* * * * *